April 21, 1931.     C. A. VAN DUSEN     1,802,130
AIRPLANE CONTROL
Filed July 29, 1927     3 Sheets-Sheet 1

INVENTOR
Charles A. Van Dusen
BY
Kwis Hudson+Kent
ATTORNEYS.

April 21, 1931.   C. A. VAN DUSEN   1,802,130
AIRPLANE CONTROL
Filed July 29, 1927   3 Sheets-Sheet 3

INVENTOR
Charles A. Van Dusen
BY Kwis Hudson & Kent
ATTORNEYS.

Patented Apr. 21, 1931

1,802,130

UNITED STATES PATENT OFFICE

CHARLES A. VAN DUSEN, OF CLEVELAND, OHIO, ASSIGNOR TO THE GLENN L. MARTIN COMPANY, OF CLEVELAND, OHIO, A CORPORATION OF OHIO

AIRPLANE CONTROL

Application filed July 29, 1927. Serial No. 209,240.

This invention relates to improvements in airplanes, and more particularly to the control mechanism therefor.

In airplanes having two seats side by side with one set of controls it becomes desirable, or even necessary at times, for the pilot to be relieved of the control of the plane by the other occupant. With controls arranged in the conventional manner it is difficult for the pilot to change seats with the other occupant of the plane because the foot room of the cockpit is obstructed more or less by the control column and its associated parts.

One object of my invention, therefore, is to so dispose the control apparatus of an airplane as to leave the floor space in the cockpit clear.

Another object of the invention is to accomplish the result above mentioned by means of a push-pull wheel control.

A further object is to provide a suitable mounting for a push-pull shaft, and control mechanism associated with said mounting adapted to be actuated by the rotation of the shaft.

Still another object is the centering of parts of two control mechanisms about a single horizontal axis, so as to simplify building and installation.

Further objects, and objects relating to details of construction and economies of manufacture will appear as I proceed with the description of that embodiment of the invention which, for the purposes of the present application, I have shown in the accompanying drawings, in which Figure 1 is a perspective view of a biplane with certain portions broken away in order to more clearly illustrate the invention.

Figure 1:
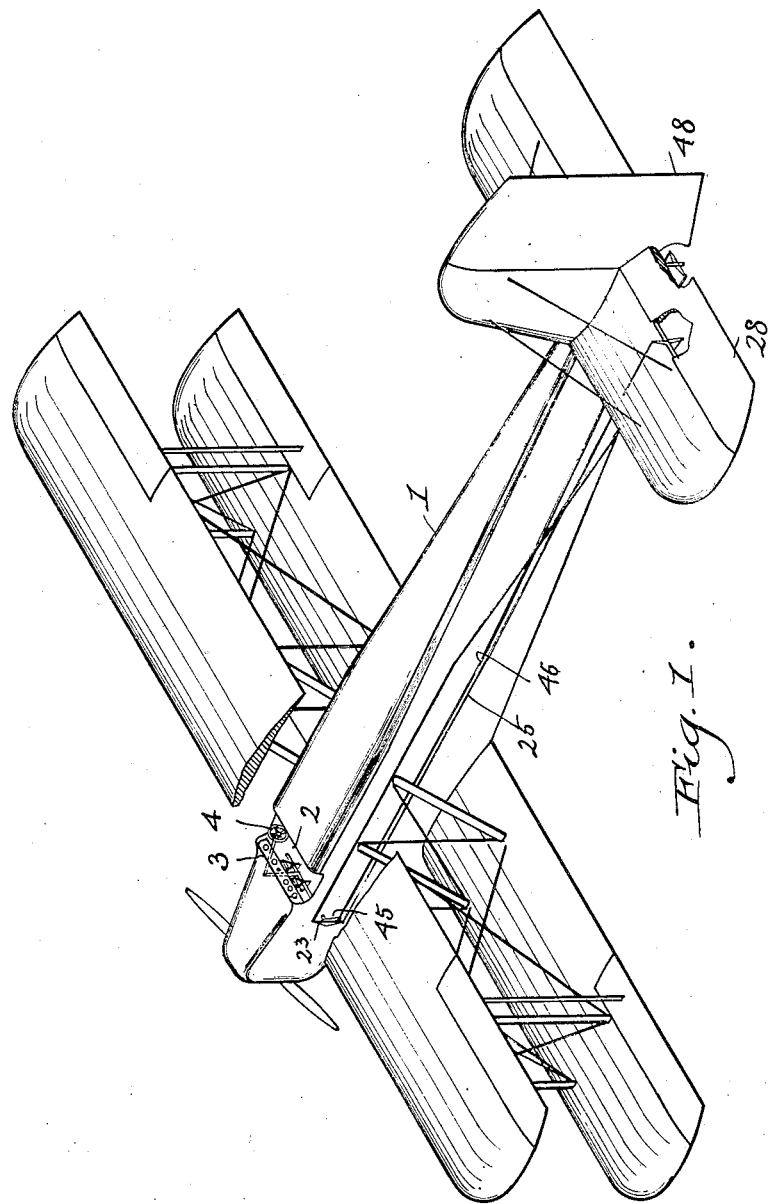
Figure 2:
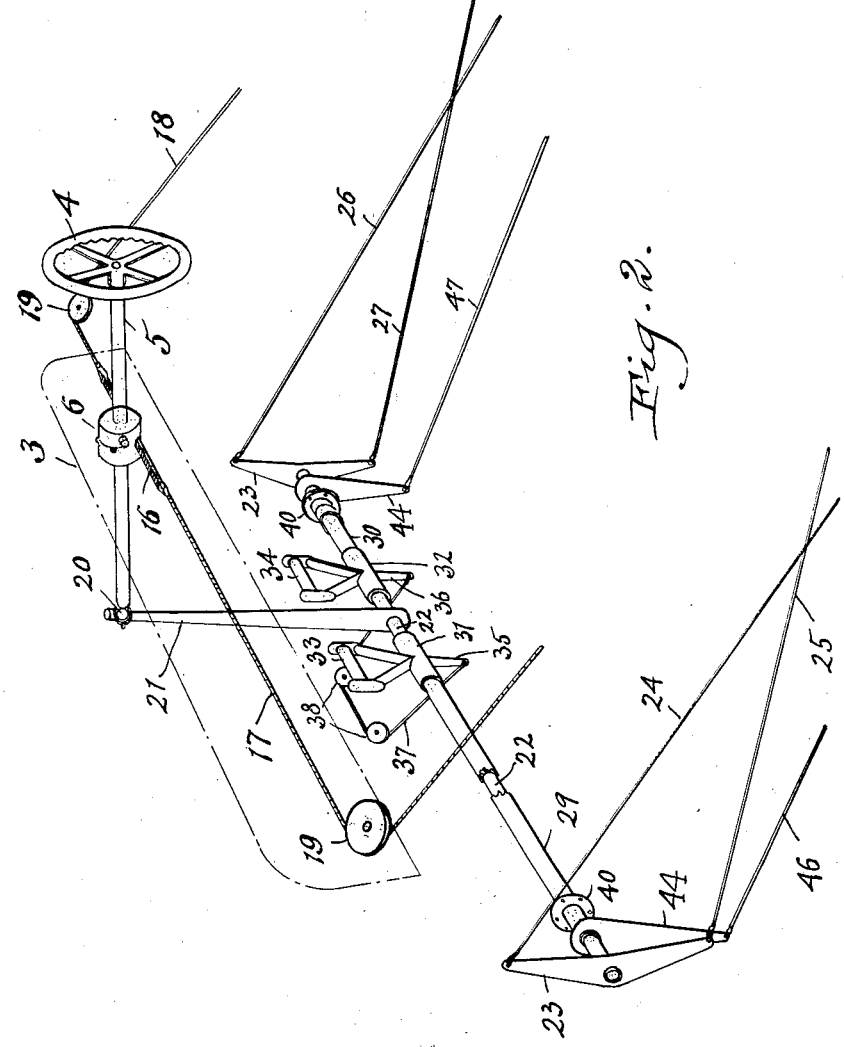
Figure 2 is a perspective view of that part of the control mechanism which is located in or adjacent to the cockpit.
Figure 3:
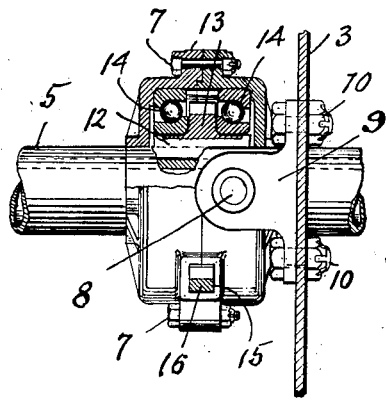
Figure 3 is a side elevation, partially in vertical section, of a mounting for a push-pull shaft employed in connection with my invention.
Figure 4:
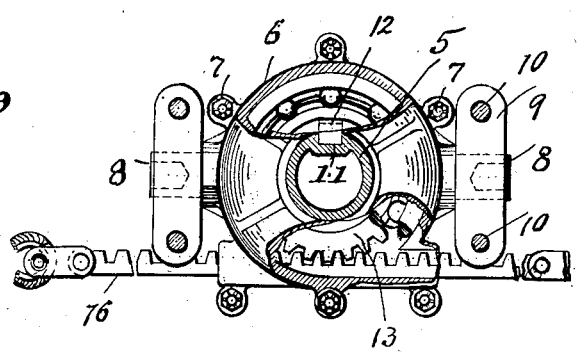
Figure 4 is a front elevation of the same with the shaft shown in section and certain parts broken away to disclose the interior structure.
Figure 5:
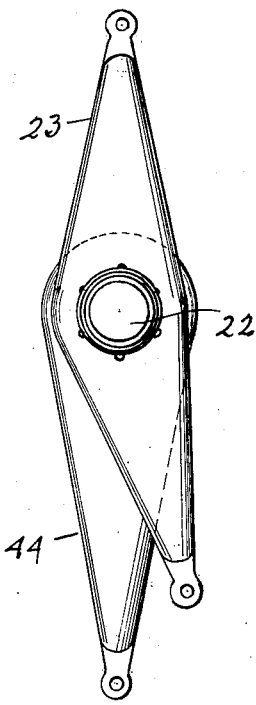
Figure 5 is an end elevation of the cross shaft showing the elevator and rudder masts mounted upon the same.
Figure 6:
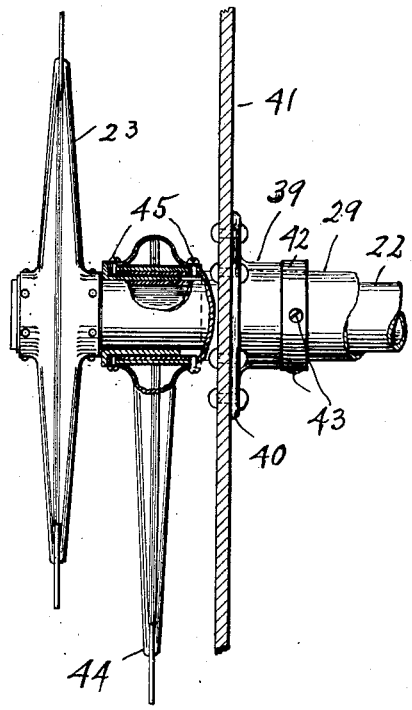
Figure 6 is a side elevation, partly in section, of the structure shown in Figure 5.

In the drawings the fuselage of an airplane is shown at 1 and the cockpit thereof at 2. The latter has seating capacity for two persons disposed side by side, the pilot occupying the side to the right in the embodiment illustrated. The instrument board is indicated at 3.

The control wheel 4 is mounted upon and fixed rigidly to a push-pull shaft 5 that is mounted for longitudinal movement as well as rotational movement. It also has a slight swinging movement in a vertical plane, which movement is incidental to its longitudinal movement.

The mounting for the shaft 5 comprises a casing 6 made in two parts secured together by bolts 7, the casing having front and rear openings through which the shaft 5 extends and in which it is free to slide and rotate. A pair of trunnions 8, integral with one of the casing halves, are disposed horizontally and mounted in a pair of brackets 9 which are attached preferably to the instrument board 3 by bolts 10 or the like.

On one side the shaft 5 is formed with an extended groove or key-way 11, in which slides a key 12 that is attached to and projects inwardly from a pinion 13 surrounding the shaft within the casing. This pinion has wide hub portions on each side of the central toothed portion, and on these hubs are mounted the inner races of ball bearings 14, the outer races being carried in the halves of the casing 6, which, of course, must have its inner walls finished accurately so as to properly center the pinion 13.

The lower side of the casing 6 is provided with an open ended track or run-way 15 within which is mounted to slide a toothed rack 16 meshing with the pinion 13. By suitable means, preferably such as will permit of relative rotation, the rack 16 is connected with the forward ends of cables 17 and 18 which extend over sheaves 19 to some movable control on the plane, as for instance, the ailerons.

The forward end of the push-pull shaft has a ball and socket connection 20 with the upper end of a rock arm 21, which is fixed at its lower end to cross shaft 22 located in the lower forward portion of the cockpit. The ends of the shaft 22 carry rigidly double arms or masts 23, to which are attached cables 24, 25, 26 and 27 extending backwardly to one of the plane controls, preferably the elevator 28.

Rotatably mounted on the shaft 22 on opposite sides of the rock arm 21 are a pair of sleeves 29 and 30, which carry hubs 31 and 32, respectively. Pedals 33 and 34 project upwardly from the latter and masts 35 and 36 project downwardly. A cable 37 is attached at its ends to the masts 35 and 36 running over sheaves 38 in its intermediate portion. On account of this connection the movement of one of these masts rearwardly necessarily causes the other to move forwardly.

The sleeve 29 nearer its outer end is mounted in a bearing collar 39 having a flange 40 riveted or otherwise secured to a panel 41 of the fuselage. A thrust collar 42 secured upon the sleeve 29 by means of screws 43 prevents outward movement of the sleeve longitudinally. Between the panel 41 and the double mast 23 the sleeve 29 carries a mast 44, the hub of this mast being secured to the sleeve by any suitable means, such as machine screws 45. The sleeve 30 is mounted in precisely the same manner as the sleeve 29 and has attached thereto a mast 44, also in the same manner. To the ends of these two masts 44 I attach cables 46 and 47, which extend rearwardly for the operation of a rudder 48.

In operating an airplane equipped with the control system illustrated herein, the pilot moves the ailerons by turning the wheel 4 and shaft 5 and thereby revolving pinion 13 and moving rack 16 to the right or left, as the case may be, to pull upon one or the other of the cables 17 and 18. At the same time he may push or pull upon the wheel 4 and its shaft 5 to swing rocker arm 21 and thereby rock the cross shaft 22 with its double masts 23 to pull upon cables 24 and 26 or 25 and 27, as the case may be, thereby actuating the elevator 28. Also at the same time with his feet on pedals 33 and 34 he may rock the sleeves 29 and 30 in opposite directions to swing the masts 44 in opposite directions, and thus to turn the rudder 48 to one side or the other. As the shaft 5 is moved through the casing 6 in order to swing the rocker arm 21 about the axis of shaft 22, the ball and socket connection 20 moves through an arc in a vertical plane and thus tilts the shaft 5 to a slight extent, this movement being permitted by the fact that the casing 6 is mounted on the trunnions 8.

Having thus described my invention, what I claim is:

1. In an airplane, control mechanism embodying a rack and pinion, a casing in which said pinion is mounted to rotate and through which said rack is mounted to slide, and a pivot mounting for said casing parallel to said rack, whereby an operating shaft may be mounted to slide in said pinion and to swing about said pivot mounting.

2. In an airplane, control means embodying a pinion, an annular bearing within which said pinion is mounted to rotate, a shaft mounted to slide in said pinion and having a non-rotatable connection therewith, and means for rotating said shaft.

3. In an airplane, a push-pull shaft, a control mechanism embodying a lever, a turnable connection between said shaft and said lever, a mount for said shaft, trunnions associated with said mount, said trunnioned mount permitting combined swinging movement of said mount and said shaft in the plane of said lever in addition to endwise and rotatable movement of said shaft.

4. In an airplane, a push-pull shaft, control mechanism embodying a lever, a universal connection between said shaft and lever, control means through which said shaft is adapted to slide, said last named control means being actuated by the rotating of said shaft, said last named control means permitting swinging movement of the shaft in the plane of said lever.

5. In an airplane, a horizontal rock shaft, an arm upon said shaft for rocking the same, control mechanism, operative connections for the same at the ends of said shaft, a pair of tubes rotatably mounted upon said rock shaft on opposite sides of said arm, a second control mechanism, operative connections between the ends of said tubes and said second control mechanism, said last named operative connections comprising an independent cable for transmitting motion of rotation from one tube to the other in the opposite direction.

In testimony whereof, I hereunto affix my signature.

CHARLES A. VAN DUSEN.